Sept. 15, 1964 R. M. STEWART 3,149,310

ELECTROLYTIC MEMORY-CELL AND SYSTEM

Filed Dec. 8, 1960 2 Sheets-Sheet 1

ROBERT M. STEWART
INVENTOR.

BY Allen E. Botney
ATTORNEY

Sept. 15, 1964 R. M. STEWART 3,149,310

ELECTROLYTIC MEMORY-CELL AND SYSTEM

Filed Dec. 8, 1960 2 Sheets-Sheet 2

ROBERT M. STEWART
INVENTOR.

BY Allen E. Botney

ATTORNEY

United States Patent Office 3,149,310
Patented Sept. 15, 1964

3,149,310
ELECTROLYTIC MEMORY-CELL AND SYSTEM

Robert M. Stewart, Encino, Calif., assignor to Space-General Corporation, Glendale, Calif.

Filed Dec. 8, 1960, Ser. No. 74,526
8 Claims. (Cl. 340—173)

The present invention relates in general to the computer and data processing art and more particularly relates to new and novel memory apparatus whose fundamental logical elements are electro-chemical in nature.

It was discovered some time ago that if an iron wire is submerged in sufficiently concentrated nitric acid, the wire will at first tend to be oxidized violently but the oxidation action will soon stop completely and the iron wire's polished surface will appear, just as it did before being placed in the acid. According to accepted nomenclature, the iron is then said to be in a "passive" state. Although some disagreement still prevails, the phenomenon is generally explained as being due to the formation of a thin film of iron oxide on the surface of the iron which protects it from further corrosion, much as aluminum oxide quickly forms on the surface of aluminum exposed to air. It is also well known that by creating a mechanical or electrical disturbance at a point near such film, a break will occur in the film at a point adjacent the disturbance and that this break will repair itself while adjacent points on the film are successively broken. The breaking process continues from one end of the film to the other, with the result that a wave, commonly referred to as a wave of "activity," appears to travel along the wire.

In accordance with the basic concept of the present invention, a large number of electro-chemical elements of the type described above are combined to form a memory unit. More particularly, these basic elements are interconnected in such a manner as to form a three-dimensional lattice arrangement of them and, by so doing, an extremely compact memory unit is formed that is capable of being programmed with the aid of a conditioning process that is very similar to the learning process. More specifically, once the electro-chemical elements are assembled in a three-dimensional lattice network, the assembly is then subjected to a program of training, completely analogous to that used for human beings, in which input patterns in the form of the referred to disturbances are sequentially presented to the memory apparatus. Following each input, the output response is compared with a previously determined desired response and, if correct, the next input pattern on the training schedule is then applied. On the other hand, if the response is not correct or is unfavorable, as shown by comparison with the pre-arranged tabulation of inputs and corresponding desired responses, a polarizing voltage is applied to the memory unit in such a way as to erase its memory of this most recent response. This procedure is repeated until the memory unit successfully imitates the entire spectrum of predetermined responses. The memory unit is now complete and ready for use in that it will now produce the same output pattern each time the same input pattern is applied to it.

In one embodiment of the present invention, the memory device consists of a closest-packed lattice of small, rigid, and electrically conducting spheres, such as small iron or steel balls, with the intervening spaces filled with an appropriate electrically conducting fluid, such as concentrated nitric acid. For the reasons mentioned previously, the solid liquid (acid-iron) interface surfaces will normally reside in the so-called passive state characterized by an inert and poorly conducting film or membrane which, if disturbed at one or more points, will convey electrochemical surface waves from ball-to-ball, the exact paths or patterns of activation taken by these surface waves depending on the condition and past history of operation of the lattice. Since variations in the concentration of the acid electrolyte may deleteriously affect the operation, apparatus is also provided that will continuously circulate fresh electrolyte into the vessel in which the lattice memory is immersed. In addition, means are also provided for applying an erase signal to the memory unit in the event an undesiable output response is obtained in response to a particular input pattern. In order to apply input patterns and to detect the responsive output patterns, a number of inert but conducting probes, such as very fine threads of platinum wire, are arranged in an orderly manner around the periphery of the lattice network, the probes being positioned so that their ends do not touch the aforesaid interface membrane but, rather, are merely in proximity to it.

Briefly considering the operation of this embodiment, waves propagated by means of the membrane formed on the iron balls are used to establish particular inter-connecting paths and logical networks from input to output terminals. Stated differently, the desired input-output relationships are first tabulated. Successive input patterns are then excited electrically in as orderly a sequence as possible and the corresponding responses noted. Many different responses are possible for any given input, the particular one occurring at any time being partly determined by small random initial variations in the film and fluid conditions at the various ball-to-ball junctions. If the initial random response is judged to be satisfactory according to the input-output relationships tabulated, the "training" schedule will proceed to other required input patterns. If, however, the response is judged to be unsatisfactory, it is erased by the application of a polarizing field to the interface membrane. The cycle is then repeated so that the desired response will ultimately be obtained by this conditioning process. The electrolyte in which the lattice structure is immersed is continually renewed by circulation from a reservoir.

One of the most novel aspects of such a memory device lies in the possible method for its fabrication and assembly. Thus, using relatively small steel balls of fairly uniform quality, a first step in the process of constructing the memory lattice herein invented would be to simply pour these small spheres into a suitably shaped container while shaping horizontally so that the small steel balls may arrange themselves in a hexagonal lattice pattern, which is the preferred pattern because it permits the maximum number of physical contacts between each ball and those surrounding it. Once arranged, the steel balls would then be fused or bonded together to form an integral unit. The step of bonding the balls together may be accomplished either by applying heat and pressure to them or by sending surges of electrical current through them. It will thus be recognized that the present invention offers an attractive opportunity to expeditiously provide a highly compact memory unit. For example, if the steel balls were about one-hundredth (.01) of an inch in diameter, they could be packed with a density of about $1.4 \times 10^6$ to the cubic inch. A volumetric density of such magnitude far exceeds anything achieved in the prior computor and data processing art.

Although an endless variety of three-dimensional lattices are available, it is felt that those lattices of simple construction are of the greatest potential value. The basic lattices of spheres described above in which each sphere contacts twelve neighboring spheres is one such simple lattice construction. A second type of three-dimensional lattice which has a certain amount of merit in its simplicity is the simple cubic lattice, in which signals may flow along vertices formed by connecting lines which are mutually orthogonal. Consequently, the particular embodiment herein involved may in one way be modified by substituting a cubic lattice memory structure for its hexagonal lattice arrangement of spheres. A cubic lattice structure will be presented in greater detail later.

Although previously mentioned, it should be mentioned once again for emphasis that the present invention makes it possible to achieve extremely high packing densities of the basic memory elements and, therefore, an extremely compact memory control or computing unit. It should be further pointed out that the present invention also makes it possible to store more than one bit of information per element since the information would be stored in the ball-to-ball junction contacts and in a three-dimensional closest-packed hexagonal lattice, twelve contacts per ball are obtained. Since each junction is shared by two balls (except on the lattice periphery), this makes a total of approximately $6n$ junctions, where $n$ is the number of balls. Thus, if iron balls with a diameter of .01 inch are used, a packing density of $1.4\times10^6$ per cubic inch is easily obtained so that $n$ in the example presented above would be $1.4\times10^6$. On this basis, a memory unit constructed in accordance with the present invention would have the ability of storing approximately $10^7$ bits of information per cubic inch. Embodiments of the present invention would, therefore, compare more than favorably with earlier forms of memory devices, such as the magnetic tape which has a capacity of approximately 4,000 bits per cubic inch, the magnetic disc which has a capacity of approximately 1,400 bits per cubic inch, and magnetic cores which can only provide a capacity of approximately 100 bits per cubic inch.

It is, therefore, an object of the present invention to provide an extremely compact memory control or computing device.

It is another object of the present invention to provide a memory device in which relatively vast amounts of information can be stored.

It is a further object of the present invention to provide a three-dimensional memory apparatus in which relatively large amounts of data can be stored per unit volume.

It is an additional object of the present invention to use electro-chemical techniques to provide a new and novel memory apparatus.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
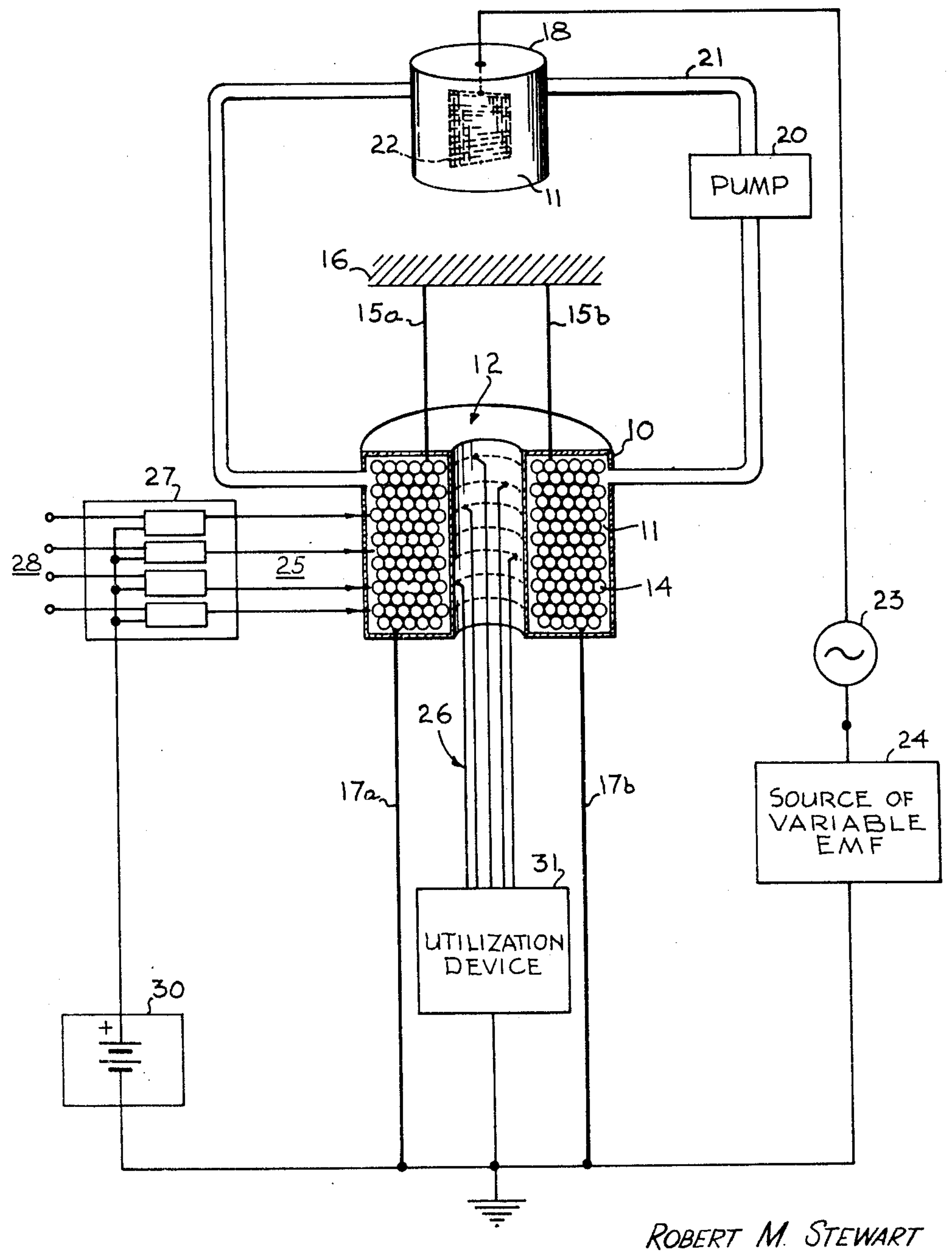
FIG. 1 is a schematic representation of one embodiment of the present invention.
Figure 2:
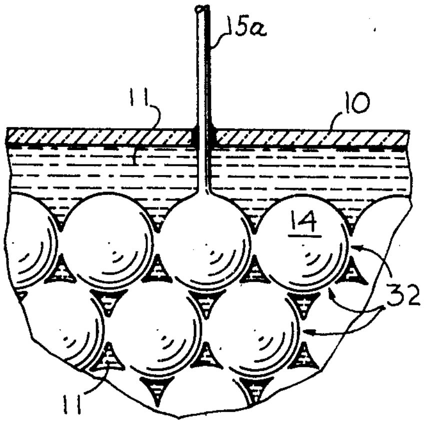
FIG. 2 is an enlarged illustration of a portion of the memory aparatus in the embodiment of FIG. 1.
Figure 3:
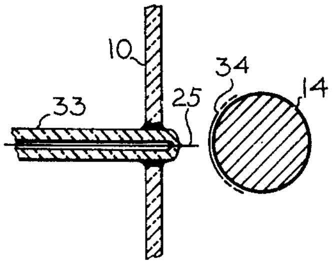
FIG. 3 is an enlarged showing of an input (or output) terminal as it is mounted on the memory apparatus of the embodimet of FIG. 1.

Referring now to FIGS. 1, 2 and 3 of the drawings, the embodiment of FIG. 1 is shown to include a tank 10 which is designed to contain both an electrolyte solution 11 and a three-dimensional lattice memory structure, generally designated 12. Electrolyte solution 11 is preferably a concentrated solution of nitric acid so that tank 10 is made of an acid-resistant material, such as glass. Considering the electrolyte solution in somewhat greater detail, its concentration is not limited to any specific range but, however, it has been learned from experiment that the most effective results are achieved when the concentration of the electrolyte solution is 40 to 60 percent nitric acid by volume. It is in this range that an interface film is obtained that is unstable but capable of spontaneously repairing itself. It should also be mentioned with respect to the matter of concentration that the most desirable acid concentration at any one time is dependent upon the ambient temperature and the composition of the material used in the construction of memory apparatus 12. In this respect if the concentration is too low, no film will be formed and the memory structure will subsequently be dissolved. On the other hand, if the concentration is too high, an interface membrane that is too stable will be developed and difficulty wil be encountered in propagating waves along the membrane or even in starting them.

As for memory structure 12, it includes a large number of iron or steel balls 14 arranged in layers one upon the other or, stated differently, arranged in a three-dimensional lattice structure preferably having a hexagonal geometry so that the balls being used will have the maximum number of contacts with each other. The lattice structure of the steel balls are clearly shown in FIG. 1. Steel balls 14 may be of any size limited only by the design requirements of the over-all apparatus. However, it will be recognized that smaller-sized balls will generally be the more desirable since the smaller the size of the balls the more of them will be contained in the lattice arrangement so that, in consequence thereof, maximum amounts of data may be retained in the memory unit. In other words, the greater the packing density, the more mechanically stable is the over-all structure and the greater is the memory storage. Since it is known that steel balls having a diameter of 0.01 of an inch have already been manufactured and are, therefore, available for general use, steel balls down to this small diameter may certainly be used and when this is done a packing density of approximately $1.4\times10^6$ balls per cubic inch is obtained, as previously mentioned. As was also mentioned before, this will permit approximately $10^7$ bits of information to be stored in each cubic inch of the memory unit.

Notwithstanding the fact that memory structure 12 is made up of a very large number of individual balls 14, the structure itself is nevertheless an integral or unitized structure in the sense that all the balls have been bonded together at the points whereat they are in physical contact with each other. A permanent physical connection between the ball elements may be attained either by sufficiently heating and pressurizing them until they are bonded or by sending suitable magnitudes of electrical current through them until they become fused to each other. Thus, ball elements 14 of memory structure 12 in FIG. 1 represents a single physically and electrically interconnected honeycomb assembly in which each of the ball elements, because of the hexagonal arrangement of them, is in permanent contact with its twelve neighboring ball elements except, of course, those ball elements that are positioned along the periphery of the aforesaid honeycomb assembly. It should finally be mentioned on this point that since memory structure 12 is contained by tank 10 along with acid 11, that is, since structure 12 is immersed in acid 11, the spacings between ball elements 14 are permeated or completely filled with acid. Furthermore, for reasons that will be made clearer later, the relative dimensions of structure 12 and tank 10 are such that a spacing of approximately one-half diameter of a ball element is maintained between the memory structure and the tank. In other words, memory structure 12 is not in physical contact with tank 10 at any point along its periphery.

In order to hold memory structure 12 in the position indicated and to provide electrical contact with the insides of the balls, one or more rods, such as rods 15*a* and 15*b*, are interposed between the memory structure and a support member 16. More specifically, rods 15*a* and 15*b* are firmly connected at one of their ends to support member 16 and at the other of their ends they are bonded to the ball elements with which they are brought into contact so as to provide a strong physical and electrical connection therewith.

As may be seen from the figure, in order for the rods to fulfill their function, it is necessary for these rods to extend through the upper portion of tank 10 in holes provided therein. Hence, in order to avoid any unnecessary evaporation of the acid solution and to prevent the acid from possibly spilling over, the space around the rods whereat they penetrate the tank should be made as airtight as possible. It wil be recognized that the composition of rods 15*a* and 15*b* is preferably the same as that of ball elements 14.

It should be mentioned that as many rods 15 may be used as required, the requirements being determined by the size and weight of memory structure 12 as well as the supporting strength of each rod 15 as determined by the composition and dimensions of the rod. Rod-like connections are also made between memory structure 12 and ground, the elements used for this purpose being designated 17*a* and 17*b* in the figure. As before, one end of each of elements 17*a* and 17*b* extends through glass tank 10 and is physically and electrically connected to ball elements 14 in the memory apparatus. The same technique for making such a connection may be employed and, furthermore, here again the point at which each rod element extends through the tank is made airtight to prevent loss of acid. The purpose of elements 17*a* and 17*b* and any other additional elements that may be used along with these two is to maintain, as much as possible, all parts of structure 12 at an equal electrical potential. Since steel balls 14 inherently have a certain amount of resistance associated with them, more than two elements 17 may be required and when this is so they will make connection to memory structure 12 at widely separated points on tank 10.

The embodiment of FIG. 1 also includes a fluid reservoir 18 which, as its name implies, contains a supply of concentrated nitric acid. A circulating or diffusing system intercouples fluid reservoir 18 and tank 10, the system mentioned including a pump device 20 and a plurality of tubes or pipes 21 serially connecting the reservoir, the pump and the tank. For obvious reasons, tubes 21 are preferably made of glass. With the aid of pump 20 and tubes 21, acid solution of proper concentration is constantly circulated into tank 10, the acid therein being recirculated back to reservoir 18 for revitalization. In any case, the primary purpose of the circulator is to prevent local "poisoning" of the acid which might occur if circulation and/or turbulence is not caused. Means other than a pump may be used to force circulation of the acid as, for example, by apparatus for appropriately heating the acid solution to provide circulating fluid convection currents.

A plate or screen device 22 is kept completely immersed in the acid contained in reservoir 18. However, this plate is electrically connected to a synchronizing oscillator 23 which is interposed between the plate and a source of variable electromotive force 24. The other side of source 24 is connected back to ground. Electromotive force source 24 may be a voltage-regulated power supply or any other suitable piece of equipment such as, for example, a battery pack connected in parallel with a rheostat whose movable center tap is connected to synchronizing oscillator 23. It will be noted that while memory structure 12 is maintained at a first potential with the aid of elements 17*a* and 17*b*, metal plate member 22 and, therefore, nitric acid solution 11 in reservoir 18 and in tank 10, is maintained at a second potential with the aid of variable electromotive source 24. As a result, a potential difference exists between structure 12 and acid solution 11 so that the interface membrane surrounding steel ball elements 14 is subjected to a potential gradient. From what has heretofore been said, it will be recognized that it is desirable to be able to apply said potential gradient equally over the entire surface area of the membrane.

Completing the construction are a plurality of input probes generally designated 25 and a corresponding plurality of output probes generally designated 26. Aside from the fact that probes 25 are for input purposes and probes 26 are for output purposes, they have many features in common, namely, each of the probes is made of a thin strand of a highly inert but highly conductive metal, such as platinum, which extends through tank 10 as did elements 15*a*, 15*b*, 17*a* and 17*b*. The probe tips inside tank 10 reach to but do not touch the oxide film surrounding memory structure 12, that is, these probe tips are contiguous to the oxide film. Probes 25 and 26 are encased by some glass tubing and the particular manner in which they are encased and the manner in which these probes are coupled through the glass tank to the oxide membrane are more fully shown and described below. Suffice it to say at this point, therefore, that rather than being grouped together, the probes in each set are uniformly distributed about the periphery of assembly 12 as much as possible.

With respect to the other ends of probes 25 and 26, that is, with respect to those probe tips that are external to tank 10, they are respectively connected to a plurality of gating circuits in a gating matrix 27, one gating circuit being connected to each probe. More specifically, each of the gating circuits has a pair of inputs and an output, the outputs respectively being connected to said probes. The first inputs of these gating circuits are respectively connected to a corresponding plurality of input terminals 28 by means of which input patterns are applied to the system. The second gating circuit inputs, on the other hand, are commonly connected to the positive or anode end of direct-current voltage source 30. The other end of source 30, as may be expected, is grounded. Gating circuits 27 may be mechanical or electronic in nature but in either case they would be of the type that would pass the positive voltage of source 30 to probes 25 when activated by an input pattern applied to the associated input terminals 28. A relay would be an example of a device that may be used as a mechanical type gating circuit. As for output probes 26, the external ends of these probes are connected to a utilization device 31 which, as its name implies, may be any device which is capable of making use of the output responses obtained at probes 26. A number of such devices will readily come to mind to those who are skilled in the computer or data processing art.

Looking now to FIG. 2, a small but enlarged portion of the structure shown in FIG. 1 is presented, namely, the portion around the intersection of element 15*a*, tank 10, and structure 12. These elements are clearly shown in FIG. 2 and as may be seen from them, rod 15*a* passes through tank 10 and is integral with one of the steel ball elements 14 therein. As before, an airtight coupling between rod 15*a* and tank 10 is provided. Also illustrated is the physical and electrical bonding of the steel balls, one to the other, to form a hexagonal pattern, the junction points between them being designated 32 in the figure. Finally, as is indicated, nitric acid solution 11 completely fills the spaces between the balls and also the space between the entire honeycomb assembly of these balls and the sides of tank 10. In connection with FIG. 2, although the portion around element 15*a* was taken for presentation, the portion explained might just as well have been that around rod element 15*b* or elements 17*a* and 17*b* since the structure portions in the immediately vicinity of all these elements are substantially identical.

Referring now to FIG. 3, a portion of the structure of a probe is shown, the portion under consideration being enlarged for easy understanding. As shown therein, an input probe 25, almost completely enclosed by capillary-sized glass tubing 33, extends through tank 10 until the tip thereof almost touches the oxide membrane, designated 34, formed on the surface of steel ball 14. The spacing between probe 25 and interface membrane 34 is quite small and in the order of one-tenth (1/10) the diameter of a ball. As for glass tubing 33, it also extends through tank 10 and at the point whereat it passes through the tank the tubing is bonded to the tank itself so as to form an airtight combination. Probe 25, which protrudes from tubing 33, is held firmly in position by the tubing which, in turn, is held in position by tank 10. The structural arrangement shown n FIG. 3 is the same for all of probes 25 and, likewise, is substantially identical with the structural arrangements for output probes 26 in the vicinity of tank 10.

In operation, it may be said that the memory system is at first neutral in the sense that the system is not conditioned to produce any particular desired output signal pattern in response to a particular input signal pattern. Such a conditioning, however, is needed and can be accomplished in a manner analogous to that which takes place in animal nervous systems. Thus, the input-output relationships desired are first tabulated in an orderly way. Successive input signal patterns are then excited electrically by sequentially applying these input patterns to input terminals 28 and, therefore, through gating circuits 27 to probes 25. As a result, complex activation waves are propagated along iron oxide membrane 34, the several output signal patterns produced thereby being detected in succession by output probes 26. The detected output patterns are then compared to those tabulated.

Many different responses are initially possible for any given input, the particular one occurring in any particular instance partly being determined by small "random" initial variations in film and fluid conditions at the various junctions 32 of balls 14. If the initial random response obtained for any one input pattern is judged to be satisfactory, the "training" schedule then proceeds to the next of the required input patterns. If, on the other hand, a particular output pattern is judged to be unsatisfactory after comparison with the tabulated output patterns, the entire passive film is then immediately polarized by application thereto of a voltage from electromotive source 24. This polarizing voltage will cause current to flow through the film or membrane and normal to it at every point. Since the membrane is a relatively poor conductor compared to both fluid 11 and balls 14, the current density in those areas which have been activated most recently (and whereat the film has been destroyed or altered) will be different from that which flows in those areas which have been inactive for a relatively considerable period of time and have therefore almost returned to an equilibrium state. This has the effect of erasing the behavior pattern which was most recently applied to the unit and, therefore, makes it possible to subsequently produce a different and potentially successful response. Of course, the corollary is true so that if the polarity of the polarizing voltage is reversed, the most recent behavior pattern obtained is reinforced. Since the nature of the memory unit is such that the same response is obtained from later applications of the same input pattern, the procedure delineated is followed until the device consistently responds in a satisfactory way to all desired stimuli not exceeding its capacity. The memory is now programmed or conditioned as desired.

Considering the matter of speed of transmission, synchronizing oscillator 23 generates a small background electrical oscillation at a frequency such that the period of the oscillation is substantially equal to the time it takes for a wave to travel along the interface membrane from one junction to the next. In a sense the oscillation acts like a catalyst, stimulating the wave to "move along" although inconsistencies or non-uniformities in the memory structure may cause it to lag here and there. The magnitude of the synchronizing oscillation may be quite small, in the order of a volt. With respect to operational speed, it should be mentioned here that by suitably controlling the temperature surrounding tank 10, the speed with which the memory can function is enhanced or, putting it succinctly, heating will increase the allowable speed of operation. Relatively high temperatures may be obtained by applying heat to the acid solution, enclosed in a container capable of sustaining internal pressure.

Auxiliary input data processing apparatus may or may not be required according to whether the input signal patterns are applied to input terminals 28 in parallel or in series. In the latter instance, equipment for converting the sequential patterns into simultaneous parallel patterns, such as periodically tapped delay lines, might be advantageously used. Output-to-input feedback apparatus might also be needed and used for any one of the large number of reasons feedback is commonly used in automatic control and computing systems.

Figure 4:
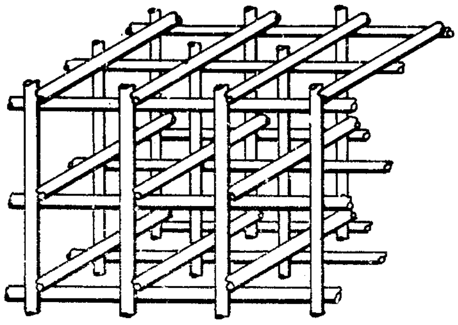
FIG. 4 is an illustration of a cubic lattice memory structure that may be used in the embodiment of FIG. 1.

In FIG. 4, there is shown another memory structure which may be substituted for the honeycomb assembly used in the embodiment of FIG. 1. The three-dimensional lattice structure of FIG. 4 has a cubic geometry and is made up of a plurality of iron or steel rods joined to each other at right angles, that is, the interconnected rods are mutually orthogonal. In this type of a lattice arrangement, the points whereat the rods are joined to each other, that is to say, the vertices, correspond to the junctions between the balls in the memory structure of FIG 1. Thus, in the structure presently under consideration, the information is stored in the vertices.

While the embodiment described herein included the use of nitric acid in solution and a steel or iron lattice arrangement, it should be noted that other electrolyte solutions and other compositions of matter for a lattice structure may be used as well. Mercury in $H_2O_2$ is another such combination. Still other electrolyte and lattice materials are available and may be employed, the only criterion for their use being whether or not they form an interface film that is unstable yet capable of regeneration. It should also be noted that the embodiment of FIG. 1 has in part been presented schematically and, therefore, it should be realized that the elements of FIG. 1 may be arranged with greater finesse than that shown. Thus, for example, a potential may be applied to the nitric acid in tank 10 by plating the inside surface of the tank instead of by using a plate or screen 22 in reservoir 18.

Having thus described the invention, what is claimed as new is:

1. Memory apparatus comprising: a plurality of electrically conducting elements physically joined to each other to form a three-dimensional arrangement of them, said elements being made of a material that chemically reacts with a predetermined electrolyte solution when immersed therein to produce an unstable and poorly conducting film between said three-dimensional arrangement of elements and the electrolyte solution; a container filled with enough of an electrolyte solution to immerse said three-dimensional arrangement of elements, said electrolyte solution being capable of chemically reacting with said elements to produce an unstable and poorly conducting interface film, said arrangement being immersed in said solution; at least two input probes coupled through said container to said interface film, said input probes being positioned so that their tips are contiguous to said film; at least two output probes displaced from said input probes and coupled through said container to said interface film, said output probes being positioned so that their tips are contiguous to said film; and means for selectively applying an electric field of predetermined strength to said interface film.

2. In a memory apparatus, the combination comprising: a plurality of electrically conducting elements physically joined to each other to form a three-dimensional arrangement of them, said elements being made of a material that chemically reacts with a predetermined electrolyte solution when immersed therein to produce an unstable and poorly conducting film between said three-dimensional arrangement of elements and the electrolyte solution; a container filled with enough of an electrolyte solution to immerse said three-dimensional arrangement of elements, said electrolyte solution being capable of chemically reacting said elements to produce an unstable and poorly conducting interface film, said arrangement being immersed in said solution; at least two input probes coupled through said container in such a manner as to be contiguous to said film; and at least two output probes displaced from said input probes and coupled through said container in such a manner as to be contiguous to said film.

3. In a memory apparatus, the combination comprising: a container substantially filled with an electrolyte solution that will chemically react with selected metals immersed therein to produce an interface membrane capable of propagating a wave; a plurality of metallic elements physically joined to each other in such a manner as to form a three-dimensional lattice structure, the metal for said elements being of a kind that will chemically react with said electrolyte solution when immersed therein to produce an interface membrane capable of propagating a wave, said structure being immersed in said solution; and a plurality of probes coupled through said container in such a manner as to be contiguous to said interface membrane, some of said probes being input probes and some of said probes being output probes.

4. Memory apparatus comprising: a container substantially filled with nitric-acid solution; a plurality of relatively small iron balls physically joined to each other in such a manner as to form a three-dimensional lattice structure, said structure being immersed in said nitric acid solution; whereby said nitric acid solution and said iron balls chemically react to produce an interface membrane capable of propagating a wave; a plurality of probes coupled through said container in such a manner as to be contiguous to said interface membrane, some of said probes being input probes and some of said probes being output probes; and means for selectively applying an electric field of predetermined strength to said interface membrane.

5. The memory apparatus defined in claim 4, said apparatus further including means for circulating nitric-acid solution into and out of said container.

6. Memory apparatus comprising: a container substantially filled with nitric-acid solution; a plurality of rod or wire-shaped elements made of iron and physically joined to each other in such a manner as to form a three-dimensional lattice structure, said structure being immersed in said nitric acid solution, whereby said solution and said iron elements chemically react to produce an interface membrane capable of propagating a wave; a plurality of probles coupled through said container in such a manner as to be contiguous to said interface membrane, some of said probes being input probes and some of said probes being output probes; and means for selectively applying an electric field of predetermined strength to said interface membrane.

7. The memory apparatus defined in claim 6, said apparatus further including means for circulating nitric-acid solution into and out of said container.

8. A memory apparatus comprising: a container substantially filled with an electrolyte solution that will chemically react with selected metals immersed therein to produce an interface membrane capable of propagating a wave; a plurality of metallic elements physically joined to each other in such a manner as to form a three-dimensional lattice structure, the metal for said elements being of a kind that will chemically react with said electrolyte solution when immersed therein to produce an interface membrane capable of propagating a wave, said structure being immersed in said solution under pressure and at above-ambient temperature; means for maintaining said immersed structure and under predetermined pressures and temperatures; and a plurality of probes coupled through said container in such a manner as to be contiguous to said interface membrane, some of said probes being input probes and some of said probes being output probes.

References Cited in the file of this patent

UNITED STATES PATENTS

| | | |
|---|---|---|
| 673,952 | Hildbrugh | May 14, 1901 |
| 1,097,801 | Heinz | May 26, 1914 |
| 1,717,488 | Andrews | June 18, 1929 |
| 2,049,553 | Weaver | Aug. 4, 1936 |
| 2,406,345 | Brennan | Aug. 27, 1946 |
| 2,800,616 | Becker | July 23, 1957 |

FOREIGN PATENTS

| | | |
|---|---|---|
| 4,983 | Australia | Nov. 30, 1926 |
| 215,897 | Great Britain | May 22, 1924 |